Patented Feb. 26, 1952

2,587,437

UNITED STATES PATENT OFFICE 2,587,437

DI(ALKENYL CARBONATE) ESTERS OF ALKYLIDENE BIS-PHENOLS

James A. Bralley, Bristol, Pa., and Frank B. Pope, Cuyahoga Falls, Ohio, assignors to The B. F. Goodrich Company, New York, N. Y., a corporation of New York No Drawing. Application March 19, 1947, Serial No. 735,794

6 Claims. (Cl. 260—77.5)

This invention relates to new chemical compounds, and pertains more specifically to certain unsaturated diesters which are capable of polymerization to form non-thermoplastic polymers, and to the polymers obtained by such polymerization.

It is well known that various unsaturated diesters may be polymerized to form polymers of high molecular weight which are industrially useful. However, all of the materials previously known suffer from a variety of disadvantages, one of the most important of which is the fact that a relatively large shrinkage in volume occurs during the polymerization reaction. This fact, of course, makes it impracticable to use such materials as molding resins of the thermosetting variety because of the impossibility of obtaining accurate dimensions in the finished product.

We have now discovered a certain class of unsaturated diesters which possess the property of polymerizing readily, particularly in the presence of organic peroxide catalysts, to form hard, clear, non-thermoplastic, resinous, solid materials, and which in addition change very little in volume during the polymerization process. The materials which possess these properties are certain esters of carbonic acid. More particularly, these materials are dicarbonate esters of alkylidene and alkylene bis-phenols in which each of the hydroxy groups of the bis-phenol is esterified with a carbonic acid group and the carbonic acid groups are further attached by their second valences to polymerizable alkenyl groups. That is, these materials are compounds having the general structure

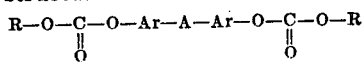

in which R represents alkenyl, Ar represents arylene and A represents a saturated bivalent aliphatic hydrocarbon radical, i. e., an alkylidene or an alkylene radical, and which therefore may be called bis-(alkenylcarbonato-aryl) alkanes. They are further characterized in that the alkenyl radical represented by R is an alkenyl radical containing a methylene group attached by a double bond to a carbon atom, i. e., an alkenyl radical containing the characteristic $CH_2{=}C{<}$ structure. The arylene radicals represented by Ar have each of their connecting valences on nuclear carbon atoms and preferably, although not necessarily, are arylene radicals containing only discrete (i. e., not condensed) benzene rings and having their two connecting valences in para position to each other, such as p-phenylene and hydrocarbon-substituted p-phenylene radicals, since such compounds are most easily prepared.

These diesters are prepared by a variety of methods; for example, a suitable alkenol may be reacted with phosgene to form the corresponding alkenyl chloroformate (or chlorocarbonate) as described by Schving et al., Bull. Soc. Chim. 43, 857–9 (1928). Two molecular proportions of the alkenyl chloroformate may then be reacted with the appropriate bis-phenol with the elimination of two molecular proportions of hydrogen chloride, to form the desired polyester as shown in the following equations:

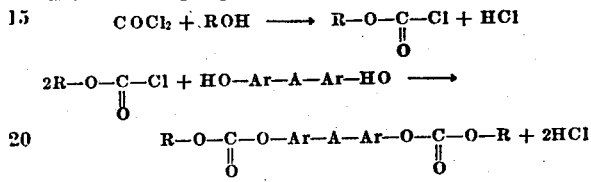

The diesters are also formed by reacting the phosgene with the desired bis-phenol to form the dichloroformate followed by reacting the product with two molecular proportions of the desired alkenol with the elimination of two molecular proportions of hydrogen chloride, as shown in the following equations:

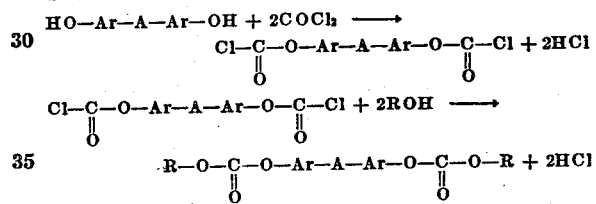

A third method comprises mixing together simultaneously all three reagents, the bis-phenol, the phosgene, and the alkenol in the proper molecular proportions.

All of these reactions involving phosgene and the ester of chloroformic acid are best carried out at moderate temperatures in order to avoid the formation of undesirable by-products, preferably at a temperature below about 100° C., and more particularly at about 0 to 20° C. It is unnecessary to employ an excess of any of the reagents above the amount theoretically necessary for the reaction, although such an excess is not harmful. Solvents which are relatively inert to the reactants such as acetone, ether, benzene, or the like, may be employed as the reaction medium, although in many cases no solvent at all is necessary. It has been found that the second step of the two step reactions, that is, the reaction between the ester of chloroformic acid and the alcohol or bis-phenol is greatly accelerated by the use of a strong base, which aids in the elimination of hydrogen chloride from the reactants. Bases such as sodium hydroxide, potassium hydroxide, as well as organic materials such as pyridine, quinoline, or the like, are suitable materials for this purpose.

Of the three methods described for the preparation of our new product, best results have been obtained with the first, that is, the process in which the phosgene is reacted with the alkenol to form an alkenyl chloroformate, followed by reacting two molecular proportions of the chloroformate with the bis-phenol.

Among the alkenols which may be employed in such a process are the following: allyl alcohol, methyl vinyl carbinol, allyl carbinol, vinyl ethyl carbinol, methyl allyl carbinol, beta-allyl ethyl alcohol, beta-methyl allyl alcohol, beta-ethyl allyl alcohol, and the like all of which contain from 3 to 5 carbon atoms and have a methylene group attached by a double bond to a carbon atom. Of these, allyl alcohol and the beta-alkyl allyl alcohols, such as beta-methyl allyl alcohol, are preferred.

Any of the bis-phenols of the structure

HO—Ar—A—Ar—OH wherein Ar is an arylene hydrocarbon radical and A is a bivalent saturated aliphatic hydrocarbon radical, may be used to prepare the diesters of this invention. Examples of alkylidene bis-phenols of this structure include bis-(4-hydroxyphenyl) methane; 2,2 - bis - (4 - hydroxyphenyl) propane; 2,2-bis(4-hydroxyphenyl) butane; 2,2-bis-(4-hydroxyphenyl)-4-methyl pentane; 1,1-bis-(4-hydroxyphenyl) ethane; bis-(4-hydroxy-2,6-dimethylphenyl) methane; 1,1-bis- (2,5-dimethyl-4-hydroxyphenyl) propane; 2,2-bis-(3-methyl-4-hypdroxyphenyl) propane; 2,2-bis-(3-isopropyl-4-hydroxyphenyl) propane; 2,2-bis-(3-phenyl-4-hydroxyphenyl) propane; 2,2-bis-(4-hydroxyphenyl) heptane; 3,3-bis-(4-hydroxyphenyl) pentane; bis- (4-hydroxy-1-naphthyl) methane and their homologs. Such bis-phenols are most easily prepared by the condensation of two moles of a monohydric phenol with a ketone, as is known to those skilled in the art. Other bis-phenols of the above structure which may also be used include 1,2-bis-4-hydroxyphenyl) ethane, 1,2 - bis - (2 - hydroxyphenyl) ethane; 1,5-bis-(4-hydroxyphenyl) pentane; 1,3-bis-(4-hydroxyphenyl)-2,2-diethyl propane and their homologs.

The unsaturated esters of this invention may readily be polymerized by any of the methods commonly used for the polymerization of unsaturated organic materials. Any of the usual catalysts such as per-compounds, actinic light, etc., may be used to accelerate the polymerization process. Excellent results have been obtained by using as a catalyst an organic peroxide such as diacetyl peroxide, acetyl benzoyl peroxide, dibenzoyl peroxide, dicaprylyl peroxide, di-o- chlorobenzoyl peroxide, ditoluyl peroxide, and the like. Although the polymerization may be carried out in solution or in aqueous emulsion, it is preferred, when the material is used as a molding compound, to carry out the polymerization merely by dissolving a suitable amount of catalyst (from 0.05 to about 5% by weight or more) in the monomeric polyester, placing the material in a mold, and allowing it to remain there until polymerization is complete. The reaction may be accelerated, of course, by heating the mixture moderately, that is, to a temperature below about 150° C., preferably to a temperature of 60° to 100° C. It may also be accelerated by the presence of small amounts of other polymerizable compounds such as di-acrylate esters and maleic anhydride. It has been found that the polymerization reaction tends to be inhibited by the presence of atmospheric oxygen, and for that reason it is preferred to carry out the polymerization in a closed container, from which substantially all of the atmospheric oxygen has been removed. Because of the extremely low shrinkage attendant upon the change from the monomeric to the polymeric condition of these polyesters, objects may be cast and molded very accurately to required dimensions. Moreover, the molded product is optically clear and free from strain and flaws.

The following specific examples are intended to illustrate more fully the nature of the invention, but are not to be construed as a limitation upon the scope thereof.

*Example I*

To a mixture of 34 parts by weight of 2,2-bis-(4-hydroxyphenyl) propane, 37 parts of allyl chloroformate, and 40 parts of acetone, there was added slowly and with continuous stirring a solution of 13 parts of sodium hydroxide in 30 parts of water while the temperature of the reaction mixture was maintained at about 10° C. Stirring of the reaction mixture was continued while the temperature was allowed to rise to about 25° C. The mixture was then washed several times with alkali and then with water to remove any unreacted bis-phenol and the sodium chloride; a small amount of acetone was then added to the product, and the mixture was heated to 150° C. at less than 1 mm. pressure in order to remove all of the acetone and water. The product, 2,2-bis-(4-(allylcarbonato) phenyl) propane, of the formula

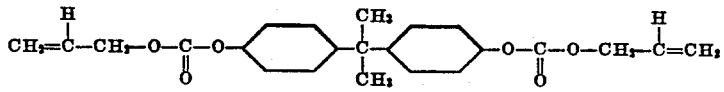

was a water white, viscous liquid having a refractive index at 20° C. of 1.5422 and a density of about 1.1 to 1.2.

*Example II*

57.1 parts by weight of 2,2-bis-(3-phenyl-4-hydroxyphenyl) propane were mixed with 37.1 parts of allyl chloroformate and the mixture dissolved in 40 parts of acetone. To this solution there was slowly added with stirring a solution of 12.8 parts of sodium hydroxide dissolved in 60 parts of water, while maintaining the temperature of the reaction mixture at about 5 to 10° C. Stirring of the reaction mixture was then continued for one hour while the temperature rose to about 25° C. The reaction mixture was then allowed to separate into a water layer and an oil layer; the oil layer was dissolved in ether, the ether solution washed repeatedly with alkali and then with water until free of alkali, dried over anhydrous sodium sulfate and the ether removed.

The product remaining, 2,2-bis-[3-phenyl-4-(allylcarbonato)-phenyl] propane of the structure

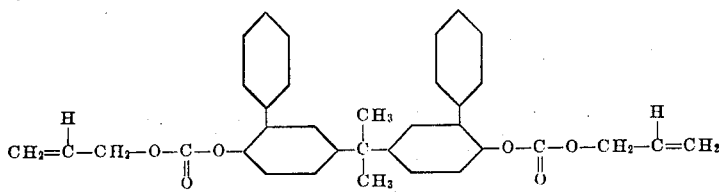

was a viscous oily liquid and was obtained in 88% yield.

*Example III*

The procedure of Example I was repeated using, in place of 2,2-bis-(4-hydroxyphenyl) propane, an equimolecular proportion of 1,5-bis-(4-hydroxyphenyl) pentane (which may be prepared by condensing two moles of anisaldehyde with one mold of acetone; completely hydrogenating the non-aromatic portion of the product and then demethylating the ether groups to the bis-phenol). The product 1,5-bis-[4-(allylcarbonato)-phenyl] pentane of the structure

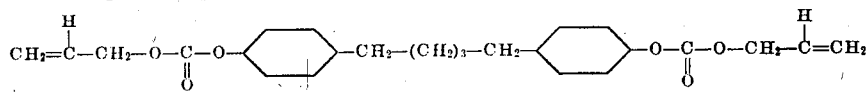

was a viscous oily liquid and was obtained in good yield.

In the manner specifically set forth in the examples, the diallyl dicarbonate esters of the other bis-phenols mentioned hereinabove are also prepared. Moreover, the corresponding dimethallyl esters and other dialkenyl esters of the class herein described are obtained when methallyl chloroformate and other alkenyl chloroformates are used in place of allyl chloroformate. Such compounds are generally liquids or low melting solids, and, when in the pure form, are clear and colorless.

As mentioned hereinabove, the monomeric unsaturated diesters of this invention may be polymerized by heating in the presence of any of the usual peroxide catalysts. For example, the 2,2-bis-[4-(allylcarbonato phenyl] propane of Example I was mixed with 2% by weight of benzoyl peroxide and the mixture was heated for 24 hours at 75° C. The liquid monomer gelled to a fusible partially polymerized solid in 95 minutes, and continued heating produced a hard, crystal-clear, non-thermoplastic resin. The shrinkage of the material during polymerization was only 6.1% and the final product possessed a Barcol Impressor hardness of about 25. The refractive index of the polymer was 1.5662 and it possessed excellent flexural strength. These properties render it unusually adaptable for use in casting of optical pieces, in low-pressure laminating and for various other purposes.

Other polyesters within the scope of this invention may be polymerized by similar methods to give similar hard, non-thermoplastic resins using the same or other catalysts. It is also possible to employ mixtures of two or more of these polyesters with each other in such a polymerization, as well as mixtures of these polyesters with other polymerizable unsaturated compounds, as well as with plasticizers, pigments, fillers, other polymers or resins, dyes, etc.

Because of the fact that atmospheric oxygen tends to inhibit the polymerization of these materials, it is generally desirable to carry out the polymerization in a closed vessel from which the air has been removed by evacuation or by replacement with nitrogen or other inert gas. Any air dissolved in the monomeric material may be removed prior to polymerization by placing the material in a closed vessel and reducing the pressure therein.

Although specific examples of the invention have been herein described, it is not intended to limit the invention solely thereto, but to include all of the obvious variations and modifications falling within the spirit and scope of the appended claims.

This application is a continuation-in-part of our copending application Serial No. 579,164 filed Feb. 21, 1945 now U. S. Patent No. 2,455,653.

We claim:

1. An unsaturated diester of the formula

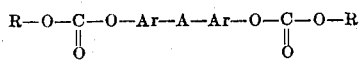

wherein R is an alkenyl radical containing from 3 to 5 carbon atoms and having a methylene group attached by a double bond to a carbon atom, Ar is an arylene hydrocarbon radical having each of its connecting valences on nuclear carbon atoms and being selected from the class consisting of p-phenylene and monophenyl-substituted p-phenylene radicals and A is an alkylidene hydrocarbon radical containing from 1 to 7 carbon atoms.

2. 2,2-bis-[4-(allylcarbonato) phenyl] propane of the formula

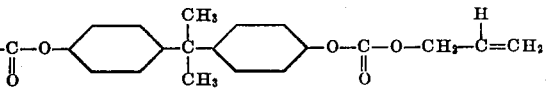

3. A polymer of the unsaturated diester defined in claim 1.

4. A polymer of the compound of claim 2.

5. An ester of (A) an alkylidene-bis-phenol wherein the alkylidene radical is a hydrocarbon radical containing up to 5 carbon atoms, and (B) an acid ester of carbonic acid and allyl alcohol; wherein both hydroxy groups of (A) are esterified with (B).

6. The polymer of the ester of claim 5.

JAMES A. BRALLEY.
FRANK B. POPE.

REFERENCES CITED

The following references are of record in the file of this patent:

UNITED STATES PATENTS

| Number | Name | Date |
| --- | --- | --- |
| 2,370,567 | Muskat et al. | Feb. 27, 1945 |
| 2,370,571 | Muskat et al. | Feb. 27, 1945 |
| 2,379,250 | Muskat et al. | June 26, 1945 |
| 2,379,251 | Muskat et al. | June 26, 1945 |
| 2,384,115 | Muskat et al. | Sept. 4, 1945 |
| 2,385,932 | Muskat et al. | Oct. 2, 1945 |